July 4, 1961

T. J. MALLEY ET AL 2,991,255

EXTRUSION OF CHROMIA ALUMINA CATALYSTS

Filed Oct. 3, 1957

```
┌─────────────────────────┐
│ FILTER CAKE CONTAINING  │
│ 70-90% ALUMINA,         │
│ 10-30% CHROMIUM OXIDE,  │
│ 1-3 % POTASSIUM OXIDE,  │
│ 2-6% SILICA,            │
│ (BASED OF FINAL CATALYST│
│   COMPOSITION)          │
└─────────────────────────┘
             │
   ┌───────────────────┐
   │ SPRAY DRY FILTER  │
   │ CAKE TO A SOLIDS  │
   │ CONTENT OF BETWEEN│
   │   64 AND 74 %     │
   └───────────────────┘
             │
   ┌───────────────────┐
   │ PARTIALLY CALCINE │
   │ SPRAY DRIED MATERIAL│
   │ TO SOLIDS CONTENT │
   │ OF BETWEEN ABOUT  │
   │   80 AND 90 %     │
   └───────────────────┘
             │
   ┌────────────────────┐
   │ PLASTICIZE TO SOLIDS│
   │ CONTENT OF BETWEEN │
   │ 45 AND 60 % SOLIDS. AND│
   │ MULL WITH LUBRICANT│
   └────────────────────┘
             │
       ┌─────────┐
       │ EXTRUDE │
       └─────────┘
             │
         ┌─────┐
         │ DRY │
         └─────┘
             │
       ┌─────────┐
       │ CALCINE │
       └─────────┘
```

*INVENTORS*
THOMAS J. MALLEY
HARVEY D. SCHINDLER

BY

ATTORNEY

2,991,255
EXTRUSION OF CHROMIA ALUMINA CATALYSTS

Thomas J. Malley, Stamford, and Harvey D. Schindler, Darien, Conn., assignors to American Cyanamid Company, New York, N.Y., a corporation of Maine
Filed Oct. 3, 1957, Ser. No. 688,045
6 Claims. (Cl. 252—455)

The present invention relates to an improved process for the preparation of alumina base chromium oxide dehydrogenation and reforming catalysts and to the catalysts so prepared. More particularly, the present invention relates to an improved process for the preparation of extruded chromium oxide activated alumina base catalysts having good strength and activity.

Alumina based chromium oxide catalysts are used for several types of dehydrogenation. The most outstanding type is the conversion of paraffins to olefins and diolefins. An example of such a conversion is n-butane to butene or butadiene. Other examples include the preparation or production of propene from propane, isobutene from isobutane, styrene from ethyl benzene and methyl styrene from isopropyl benzene. Chromium oxide alumina catalysts are for the most part widely known and have been used in bead form for various purposes, principal among which is dehydrogenation.

In preparing extruded catalysts, different problems are encountered than are encountered in the preparation of bead catalysts. Generally speaking, in the preparation of extruded catalysts, the difficulties which are encountered on a small scale are magnified and intensified when attempts are made to produce them on a larger commercial scale. This is particularly true if the catalyst produced is to be uniform and consistently prepared having a high degree of activity as calculated on a weight and volume basis as these terms are understood in the art, and is to have good compression strength, a necessary prerequisite for fixed bed catalysts.

Thus, for example, we have found that if the ratio of base and activating materials, the proper use of lubricants, plasticizers and other variables are not controlled within relatively narrow limits as to amounts, time of addition, conditions of addition, and the like, extrudates having poor strength and a ready tendency to crumble or extrudates which are gummy are prepared. Further, if the extrusion mix is not of the proper composition and content, it has been found that in many instances, the formation of an extrudate is extremely difficult if not impossible in that the extrusion mix tends to ride on the extruder rather than being extruded.

While it would seem that many of these difficulties could be readily overcome simply by adding more or less material or more or less moisture to any given extrusion mix, practical information dictates to the contrary, either because the extrusion mix after such modification simply is incapable of forming a good extrudate or that such seemingly minor variations in a given procedure result in a final product which, while having a good appearance and capable of extrusion, have unexpectedly poor compression strength.

Thus, it is an object of the present invention to provide a novel process for the preparation of an extruded alumina base chromia activated catalyst. It is a further object of the present invention to provide such a novel process whereby an alumina base chromium oxide activated catalyst having good activity and strength and appearance may be readily prepared in large commercial quantities.

These and other objects of the present invention will become apparent from the detailed description of the present process as it is set forth hereinbelow.

According to the present invention, a process is provided for preparing an extruded alumina base chromium oxide catalyst which in its prepared state has good activity, strength and appearance, which comprises reducing the volatile content of an alumina based chromia catalyst filter cake material until a solids content of between about 80 and about 90% is obtained. This devolatilized or high solids material is mulled with a plasticizer and a lubricant to a solids content of between 45 and 60%, after which it is extruded, and the extrudate dried and calcined.

The alumina base portion of the present catalyst material may be prepared as an alumina hydrate filter cake by a number of procedures known in the prior art, as for example, that described in U.S. Patent No. 2,657,115, which disclosure is incorporated by reference in the present specification. In accordance with the process disclosed in the above-said patent, substantially alkali metal free alumina hydrate is prepared by the precipitation of aluminum hydroxide from aqueous alkali metal aluminate solution by the reaction of said aluminate solution with mineral acids under particular pH conditions. Alumina hydrate filter cake prepared by the method described in the above-identified patent or alumina hydrate filter cake prepared by other known methods desirably contains from between about 10 and 20% solids and preferably from between 13 and 17% solids.

Alumina of suitable activity for catalytic purposes in general may be prepared by precipitation from a water solution of a water-soluble aluminum compound which may be either an aluminum salt such as aluminum sulfate, aluminum nitrate, aluminum chloride and the like or an alkali metal aluminate such as sodium or potassium aluminate. If hydrated alumina prepared by ordinary precipitation procedures is spray dried a light, fluffy product of low apparent density, usually within the range of about 0.2–0.3 gram per cc., is obtained.

According to the present invention, it is preferred to employ as a base an alumina gel of high spray-dried density prepared by precipitating hydrated alumina under controlled conditions of alkalinity, either during its formation or in a subsequent step, or both, which will convert it into a form in which it is responsive to, or can be densified by homogenization. "High density alumina gel catalyst base" as the term is used herein, is intended to include alumina gels which when dried, as for example, spray dried, have an apparent bulk density (ABD) of between about 0.4 and 1.3 grams per cc. and higher. In accordance with the present invention, the activator material, for example, the chromic acid with or without stabilizers, is added to the alumina base prior to homogenization.

Generally, such gels may be prepared by the densification by comminution of a hydrated alumina which has been made responsive to homogenization, either by precipitation from an aqueous solution of a water-soluble aluminum compound under the alkaline conditions hereinafter described, or which has been aged under alkaline conditions at a pH higher than that of its precipitation, or both. Hydrated gels so prepared may then be impregnated with the activating component, as for example, chromic acid.

Hydrated alumina capable of being densified by comminution can be obtained by precipitation from a water-soluble aluminum compound within a pH range between about 8.2 and 10.5. When these conditions are maintained, the alumina is precipitated in a crystalline form in which it can be filtered at reasonably good filtration rates and washed free from contaminants and the alumina particles can be broken down to an increasing extent by increasing the severity of comminution. The degree of response of the hydrated alumina to comminution increases with increasing pH values within the above range, but at pH values above 10.5 the formation of slimes is noted and control of density by homogenization is erratic. One of the primary control points in obtaining alumina of controlled density is therefore the adjustment of the hydrated alumina precipitation or strike within the indicated range.

The second principal control feature to be used in regulating the density of the dried alumina is the extent or severity of comminution. Since a practical and preferred method of comminuting the hydrated alumina is by passing it through a homogenizer, this factor can be conveniently and accurately described with reference to an ordinary spring-loaded homogenizing valve. Thus, the homogenizing apparatus employable might consist of a high pressure pump such as Manton-Gaulin piston type pump capable of delivering pressure up to 3000 lbs. per square inch, followed by a homogenizing valve. The pressure drop across the homogenizing valve should be adjustable so that the extent of homogenization can be controlled. In the present specification, the extent of comminution is therefore defined as that corresponding to the homogenization obtained by passing the hydrated alumina slurries through such a valve at a defined pressure drop. Normally, this drop will be from between 200 and 3000 pounds per square inch.

Hydrated alumina capable of being densified by comminution is also obtainable by aging the hydrated alumina slurries under alkaline conditions. It has been found that an effective response to homogenization is obtainable by aging these slurries under more strongly alkaline conditions than those used in the alumina precipitation and within the pH range of about 10.0–11.0. While hydrated alumina precipitated from water-soluble aluminum compounds at pH values of from 7.0 to 9.0 can be made responsive to homogenization by aging at pH values within this range, a considerably better response is obtained with slurries of hydrated alumina precipitated in the pH range of 9–10.5. The preferred method of obtaining alumina and impregnated alumina catalysts of controlled density therefore includes the densification by homogenization of hydrated alumina precipitated from water-soluble aluminum compounds at a pH from 9 to 10.5 and aged at a pH within the range of 10–11. In all cases, the aging should be continued for at least 0.25–0.5 hour, and may be continued for 1 hour or longer.

The response of the alumina to comminution can also be increased slightly by controlling the per cent of solids in the strike. However, if the strike solids are below about 4% the filtering and washing characteristics of the alumina are impaired because of the formation of slimes and it may become difficult or impossible to remove sodium compounds and other impurities to the extent necessary for catalytic purposes. For most purposes, the strike solids are therefore maintained between about 5% and 7% with a top limit of about 9%; at higher strike solids the viscosity is such that it is difficult or impossible to maintain uniform pH conditions throughout the strike tank. Efficient and powerful agitation, as by the use of turbine agitators, is particularly desirable at high strike solids to assist in maintaining a pH at a uniform level.

Regardless of how the hydrated alumina is prepared, after its preparation it is mixed with the activating compound or compounds. In order to accomplish this, the hydrated alumina (normally as a filter cake) may be reslurried and a solution of chromic acid or other source of chromic oxide or chromia is added thereto in such amounts as to provide a catalyst having the desired final composition. While chromic acid is the preferred source of chromia in the final catalyst composition, other compounds capable of being reduced to chromic oxide may be employed. Thus, for example, potassium chromate or dichromate, ammonium chromate or dichromate, and chromium nitrate may be employed. These compounds or their equivalents may be employed singly or in combination with one another.

Catalysts prepared according to the present invention will normally contain between 10 and 30% of chromium oxide ($Cr_2O_3$) and between 70 and 90% of alumina. A preferred chromia activated alumina catalyst contains about 80% alumina and 20% chromia.

In addition to employing chromic acid as an activating agent, it is sometimes desirable to incorporate into the catalyst composition other activating or stabilizing materials, as for example, silica or potassium oxide. Normally, materials of the latter type, if present in the final composition, are present in relatively small amounts, usually not exceeding about 10% on a solids basis of the entire catalyts composition. Thus, for example, between 1 and 3% of potassium oxide and 2 and 6% of silica may be employed.

If it is desirable to so modify the alumina base chromia oxide catalyst of the present invention, potassium silicate in aqueous solution may be added to the reslurried alumina filter cake, which addition would provide both potassium for potassium oxide and the silica. Further materials like potassium dichromate may be employed in this state in the process and as such function as a source of both potassium oxide and chromium oxide.

In accordance with the present process, it has been found that in order to prepare catalysts having desired activity, strength and appearance that the volatile content prior to the mulling and plasticizing of the catalyst composition is between about 80 and about 90% and preferably between 82 and 85%.

By "volatile content" as the term is used herein, is meant both combined water as water of hydration and apparent or free water as well as other volatile constituents which may be present in the catalyst composition. Water, both free and combined, usually constitutes at least 90% of the total volatiles and in most cases more, with the remainder being impurities and residues which are removable during final calcination. The volatile content as expressed herein is determined by loss on ignition.

The means by which the desired solids content for the activated catalyst is increased prior to plasticizing and extruding are not important to the present inventive concept. The solids content of from between about 80 and about 90% may be achieved in one or more stages. As a practical matter, and because of limitations imposed on the present process by conventional processing apparatus, the desired solids content is most readily achieved by two-stage drying or devolatilization procedures. Thus, preferably, the activated alumina gel is first spray dried to an initial solids content of from between about 64 and 74% solids, or conversely to a volatile content of from between about 26 to about 36%. These percentages are derived from the normal performance of conventional spray drying apparatus. In lieu of spray drying, other methods of drying or devolatilizing the catalyst composition may be employed. Thus, for example, the catalyst composition may be tray dried or drum dried. Spray drying has been designated herein as an exemplary method of reducing the volatile content of the catalyst composition because they are designed for handling large quantities of materials to be dried at high speeds, and thus lend themselves practically to the process of the present invention. Any suitable spray drier may be employed as a means of partially reducing the volatile content in accordance with the present invention. One that has been employed with good results is described in U.S. Patent No. 2,644,516, dated July 7, 1953. Although gas inlet temperatures up to 1300° F. have been used successfully, the temperature of drying gas entering the spray-dried chamber is preferably controlled within the range of about 500 to 1000° F. so that the catalyst composition will have its volatile content substantially reduced so as to feel dry to the touch. Operating in this range, a catalyst composition having a solids content of from between about 67 to 70% can be efficiently provided. Spray driers can, of course, be used to further reduce the volatile content or increase the solids content of the catalyst composition, but as a practical matter and for long and continued usage of such driers devolatilization within the range of between about 64 and 74% is maximum efficiency. To attempt to effect greater devolatilization shortens the life of the apparatus unnecessarily and therefore would not be favored.

If the reduction of the volatile content is to be carried out in two stages, the second stage, whereby the solids content of the catalyst composition is increased to between about 80 and 90%, may be carried out by a mild or partial calcination of the catalyst composition. If calcination is to be employed as the means for further reducing the volatile content whereby simultaneous increase in solids content is achieved, the catalyst composition may be partially calcined by employing temperatures up to between about 450 and 800° F. for times of from between about 1 hour and 2 hours. The times required to produce a given or satisfactory solids content may of course be arrived at empirically. Reducing the volatile content of the catalyst composition to a point where the solids content of said composition is between about 80 and about 90% is one of the critical aspects of the present invention. As will be illustrated hereinafter, solids content values slightly below and slightly above the upper limit result in extrudates which are deficient for one or more reasons.

The catalyst composition possessed of the proper solids content is then mulled with a plasticizer, normally water or additional catalyst slurry, and sufficient lubricant, normally an amount of from between about 1 and about 3%, based on the weight of the total catalyst composition and mulled thoroughly to reduce the solids content of the composition from between about 45 and 60% solids. This downward modification of the solids content is another essential and critical step in the present process, for it has been found that the reduction of the solids contents to values less than 45 or significantly in excess of 60% result in catalyst compositions which may not be extruded successfully in that the extrudate suffers one or more of the deficiencies of strength, activity or appearance. Normally, graphite will be employed as the lubricant material; however, soaps, fatty acids and glycerides may be employed for such a purpose.

Mixing or mulling may be accomplished in any suitable apparatus, an illustrative example of which are the Lancaster type mixer-mullers. In order to obtain a uniform or homogeneous mixture, times on the order of from between about ½ hour and 2 hours are normally employed.

After sufficient mulling, the mulled catalyst composition may be charged to a conventional solids extruder. By "conventional solids extruder" as the term is used herein is meant extruders of the type normally employed in extruded catalyst preparations and by way of reference to a specific, mechanical apparatus, a dual worm extruder such as a Welding engineer's series 2000.

After extrusion, the raw pellets are preferably dried, as for example, at a temperature of from between 200–250° F. for a short period of time, as for example, up to ½ hour, and thereafter calcined by heating them to a temperature of between 1000 and 1350° F. for about 3 hours. Thereafter, the calcined pellets may be held at this temperature range for an additional 1 to 2 hour period until they are substantially completely devolatilized and the components of the catalyst composition are fully reduced to their oxides.

An embodiment of the present invention will now be described in greater detail with reference to the accompanying drawing, the single feature of which is a flow sheet illustrating a specific embodiment thereof.

Referring to the flow sheet, it will be seen that a hydrated alumina base chromium oxide catalyst composition containing 70–90% of alumina and 10–30% $Cr_2O_3$ on a dry solids basis, and which may or may not contain activators or stabilizers such as 1–3% of potassium oxide and 2–6% silica, and which may be in the form of a filter cake containing about 10–20% solids, is spray-dried in a conventional spray-drying apparatus, as for example, the type described hereinabove, to a solids content of from between about 64 and 74%, which represents a solids content which may be normally obtained by efficient use of conventional spray-drying apparatus. This spray-dried alumina base chromium oxide catalyst composition is then partially calcined normally at temperatures up to between 450 and 800° F. until a solids content of from between about 80 and about 90% is obtained. As noted hereinabove, the time required for the production of such a solids content may be arrived at empirically and is of course dependent on temperature and time of calcination. Employing temperatures up to the above illustrative range normally requires times on the order of from between 1 and 2 hours.

The partially calcined alumina based chromium oxide catalyst composition is then mulled with a plasticizer such as water or catalyst slurry, and from 1 to about 3% of a lubricant such as graphite, based on the total composition of the catalyst mixture, until a uniform homogeneous catalyst composition having a solids content of from between 45 and 60% solids is obtained. Thereafter, the homogeneous mulled catalyst composition is extruded and the extrudate is dried and calcined to substantially completely remove the volatile content from the extruded pellets and to reduce the compounds therein to their oxides.

In order that the present invention may be more fully understood, the following examples are given primarily by way of illustration. No details contained therein should be construed as limitations on the present invention, except as they appear in the appended claims. All parts and percentages are by weight unless otherwise specifically designated.

*Example 1*

Into a suitable reaction vessel 215 parts of commercial alum (16.75% $Al_2O_3$) dissolved in 415 parts of water and sodium aluminate prepared by dissolving 146 parts of bauxite ore concentrate and 86 parts of flaked caustic in 83 parts of water are simultaneously added to a water heel of 877 parts. The resulting slurry contained 7.0% $Al_2O_3$. In this procedure, the precipitation was carried out at a pH of 9.2 and aged for ½ hour at a pH of 10 prior to initial filtration. The filter cake resulting from the initial filtration was then reslurried and a second filtration was carried out at a pH of 7.0. The filter cake resulting from the second filtration weighed 421 parts and containing 14.85% of $Al_2O_3$ was reslurried and a solution of 19.4 parts of chromic acid in 111 parts of water was added thereto. The catalyst composition is 81% $Al_2O_3$ and 19% $Cr_2O_3$ when calculated as the oxides of the respective components.

This catalyst composition was spray dried, employing an inlet temperature of 500° F. and an outlet temperature of 225° F. through a line at a line pressure of 300 pounds per square inch. This composition was not homogenized. The solids content of the spray-dried composition was 68% and it had a density of 0.41 grams per cc.

*Example 2*

Employing the same raw materials and techniques as set forth hereinabove in Example 1, alumina was precipitated at a pH of 9 and the first filtration was made at pH 10. After reslurrying the filter cake derived from the initial filtration, a second filtration was carried out at a pH of 7.

513 parts of filter cake containing 13.64% of $Al_2O_3$ was reslurried and an aqueous solution composed of 19.2 parts of kasil (27.3% of potassium silicate) and 10 parts of water were added thereto. A second addition was made to the reslurried filter cake containing a solution composed of 1.16 parts of potassium dichromate and 22.6 parts of chromic acid dissolved in 90 parts of water.

These additions were such that the final calculated composition of the catalyst would be 75% $Al_2O_3$, 19% $Cr_2O_3$, 2% $K_2O$ and 4% $SiO_2$.

This composition was spray-dried employing a line pressure of 250–300 pounds per square inch and was homogenized employing a homogenization pressure of 350–400 pounds per square inch. The density of the spray-dried catalyst was 0.47 gram per cc. and the solids content of the spray-dried material was 72.2%.

*Example 3*

As in Examples 1 and 2 above, the alumina base was prepared with the exception that the initial strike was carried out at a pH of 8.9 and ageing for ½ hour was carried out at a pH of 10. The precipitated alumina was thereafter filtered and the filter cake reslurried. To the 140 parts of the reslurried alumina filter cake containing 14.46% of $Al_2O_3$ a solution of 1.6 parts of potassium dichromate and 5.31 parts of chromic acid dissolved in 27 parts of water were added. These additions were sufficient to insure a final catalyst composition of 79% $Al_2O_3$, 19% $Cr_2O_3$ and 2% $K_2O$.

This catalyst composition was spray dried at a line pressure of 300 pounds per square inch and was not homogenized. A spray-dried catalyst having 0.49 gram per cc. density was produced and having a solids content of 65.4%.

The above illustrative examples disclose a preferred suitable method for the preparation of the alumina base chromia activated catalyst composition employable in the present process. Any of the illustrated techniques or combinations thereof may be employed.

The following examples are to illustrate the significance of the reduction of the volatile content or the increase of the solids content prior to the mulling and extruding steps. As with Examples 1–3, the following are illustrative and all parts are by weight unless otherwise specified.

*Example 4*

2¼ parts of spray-dried alumina base chromium oxide catalyst having a composition of 75% $Al_2O_3$, 19% $Cr_2O_3$, 2% $K_2O$ and 4% $SiO_2$, having a solids content of 74% and a density of 0.47 gram per cc., was mixed with 2 parts of slurried catalyst containing 14.7% solids. This formulation was mixed for 30 minutes and .04 part of graphite were added during the latter 5 minutes of this mixing cycle. This composition had a solids content after addition of the plasticizers and lubricant of 45.6%. This material was extruded through a 24 hole 0.15 inch die employing the worm-type extruding apparatus. The extrudates were gummy. Upon drying in a tray drier at 200° F. the extrudates crumbled so that further processing was deemed unwarranted.

*Example 5*

2¼ parts of a catalyst composition identified in Example 4 was mixed with 1.53 parts of water and .03 part of graphite. After 15 minutes of mixing, a homogenous mass was obtained having a solids content of 47.2%. This composition was then extruded through a 24 hole 0.15 inch die employing a worm-type extrusion apparatus and the extrudate developed surface cracks almost immediately after coming through the die head. Further work on the extrudates was deemed unwarranted.

*Example 6*

5⅕ parts of a partially calcined alumina base catalyst composition having a composition identical with that of the catalyst described in Examples 4 and 5 and having a solids content of 78.8% and a spray-dried density of 0.95 gram per cc., was mixed with 1.45 parts of water. .07 part of graphite was used as a lubricant. This composition had a solids content of 61.8%. Extrusion was made through a 24 hole 0.15 inch die, the extrudates felt gummy and their appearance was generally poor. In view of these characteristics, further work on these extrudates was deemed unwarranted.

*Example 7*

2¼ parts of a partially calcined catalyst of 91.3% solids and with an initial density of 0.47 was mixed with 2.1 pounds of slurried catalyst at 14.7% solids. .04 part of graphite was employed as a lubricant. The mix was too dry to extrude, having a solids content of 56.0%, and 0.10 part of catalyst slurry as additional plasticizer was added and extrusion again attempted. This modified mix had a solids content of 55.0%. This mix rode on the extruding worm instead of extruding.

*Example 8*

A portion of the catalyst employed in Example 4 that contained 74.0% solids was dried to a solids content of 81.7%. Two parts of this catalyst composition so dried was mixed with 1.15 parts of water and .03 part of graphite. The composition had a solids content of 52.0%. The mix was then mulled to obtain a homogeneous batch and extruded through a 28 hole ⅛ inch die head, employing a worm-type extruding apparatus. The pellets produced did not crumble, had good appearance and feel and after drying and calcining had a crush strength of the order of 16 pounds.

*Example 9*

A further portion of the catalyst described in Example 4 hereinabove was further calcined to produce an 84.9% solids composition. Two parts of this catalyst material was mixed with 1.1 parts of water and .03 part of graphite and the composition mulled to obtain a homogeneous mixture having a solids content of 52.2%, after which it was extruded through a 28 hole ⅛ inch die employing a worm-type extrusion apparatus. The extruded pellets had good appearance and feel, dried without breaking and were calcined to produce pellets having crush strength on the average of 22 pounds.

*Example 10*

2.0 parts of a spray-dried partially calcined 81.7% solids alumina base chromium oxide catalyst containing 79% $Al_2O_3$, 19% $Cr_2O_3$ and 2% $K_2O$, calculated on a dry basis, is mulled with 1.1 parts of water and 0.03 part of graphite as a lubricant. The extrusion solids were 52.0%. An addition of 0.65 part of water lowered the solids content to 43%. The composition was then extruded, but the extrudate was too wet to be cut into pellets.

3.3 parts of the same alumina-chromium oxide catalyst material as above having an 81.7% solids content was plasticized with 1.0 part of water and 0.04 part of graphite as a lubricant. This mixture was mulled until homogeneous and contained 62.8% solids. It was evident from the appearance of the material that it was too dry and that it would overload the extruder substantially immediately.

Examples 4–8 hereinabove illustrate clearly that certain apparent modifications of the extrusion mixture do not in fact produce extrusion mixtures from which alumina base chromium oxide activated catalyst pellets having good activity, appearance and crush strength can be obtained. These examples further illustrate the critical nature of the reduction of the volatile content of the pre-mulled catalyst composition to a value above about 79% and less than about 91% solids. Thus, for example, in Example 4 where the solids content was initially 74% and prior to extrusion was adjusted to 45.6%, the extrudates were wholly inadequate. This is also apparent in Example 5 wherein a catalyst composition having a solids content of 78.8% when adjusted prior to extrusion, i.e. during the mulling step, to a solids content of 47.2, produced extrudates which were however poor in appearance and gummy to the touch.

In Example 6 wherein a calcined catalyst composition of high solids content, namely 91.3%, was employed, it was extremely difficult to obtain a mixture which would even extrude and one which was extremely sensitive to modification of solids content. While it is entirely possible that a catalyst composition calcined to a solids content of 91.3% and even somewhat higher could be so modified as to obtain an extrudable mix having some or all of the desirable characteristics of extruded catalysts, it is readily apparent that at these very high solids levels the compositions after the introduction of a plasticizer and lubricant are so sensitive as to be impractical for large scale commercial operation.

Examples 8 and 9 illustrate the merit of the present invention in that the solids content of the catalyst composition is adjusted as by subsequent calcination to within the critical initial solids content range of the present invention. By the addition of plasticizer and lubricant, the solids content of these catalysts has been adjusted to be within the critical range of from 45–60% solids prior to extrusion. Of the examples, these illustrate that the proper combination of the features of the present invention results in a commercial extrudable catalyst mixture.

Example 10 illustrates that even when the catalyst composition has a solids content prior to plasticizing and mulling within the critical range of about 80 to about 90%, when the solids content is adjusted to below 45% or above 60%, the composition results in an unacceptable extrudate or extrusion mix.

As has been pointed out hereinabove, the catalysts prepared according to the present process have excellent crush strength when compared with similar catalysts. "Crush strength" as the term is used herein refers to a measure of the number of pounds of pressure required to break a pellet placed on its side between two parallel plates, to one of which is exerted a vertical pressure. Thus, for example, the minimum crush strength acceptable for commercial ⅛-inch extruded catalysts is from between 10 and 11 pounds. The extruded alumina base chromium oxide catalysts prepared in accordance with the present invention have a crush strength of between 14 and about 22 pounds and normally between 16 and about 22 pounds.

The activity of the catalysts of the present invention, as has been noted, is high. This activity may be measured by sending a paraffinic feed stock through a reactor in which there is a bed of pelleted alumina base chromium oxide catalyst. The feed stock used is 99+ mole percent ("pure" grade) n-heptane. The reaction conditions are 1 atmosphere pressure and 470° C.

The dehydrocyclization ability of a catalyst under these conditions is a measure of its activity. Extruded alumina base chromium oxide catalysts having a crush strength of about 22 pounds prepared in accordance with the present process resulted in a product that contained 21% aromatics. A commercial catalyst produced 12% aromatics under the same conditions of operation.

We claim:

1. A process for preparing an extruded alumina base chromium oxide catalyst which in its prepared state has good activity, strength and appearance which comprises filtering a slurry of an alumina base chromium oxide catalyst material to produce an alumina base chromium oxide catalyst filter cake, reducing the volatile content of said alumina base chromium oxide catalyst filter cake until a solids content of between about 80 and about 90% is obtained, mulling said alumina base material with a plasticizer and an extrusion lubricant to a solids content of between 45 and 60%, said plasticizer being selected from the group consisting of water and a slurry of an alumina base chromium oxide catalyst material, extruding said catalyst mixture and drying and calcining the extrudate.

2. A process for preparing an extruded alumina base chromium oxide catalyst as in claim 1 where, in addition to chromium oxide, the catalyst contains silica and potassium oxide.

3. A process for preparing an extruded alumina base chromium oxide catalyst which in its prepared state has good activity, strength and appearance which comprises filtering a slurry of an alumina base chromium oxide catalyst material to produce an alumina base chromium oxide catalyst filter cake, reducing the volatile content of said alumina base chromium oxide catalyst filter cake by spray drying, further reducing the volatile content of said spray dried alumina base chromium oxide catalyst material until a solids content of between about 80 and about 90% is obtained, mulling said alumina base material with a plasticizer and an extrusion lubricant to a solids content of 45 to 60%, said plasticizer being selected from the group consisting of water and a slurry of an alumina base chromium oxide catalyst material, extruding said catalyst mixture and drying and calcining the extrudate.

4. The process according to claim 3 in which the volatile content of the alumina base chromium oxide catalyst material is reduced until a solids content of between about 82 and about 85% is obtained.

5. A process for preparing an extruded alumina base chromium oxide catalyst which in its prepared state has good activity, strength and appearance which comprises filtering a slurry of an alumina base chromium oxide catalyst material to produce an alumina base chromium oxide catalyst filter cake, reducing the volatile content of said alumina base chromium oxide catalyst filter cake by spray drying, calcining the spray dried material to further reduce the volatile content and to obtain a material having a solids content of from between about 80 and about 90%, mulling said alumina base material with a plasticizer and an extrusion lubricant to a solids content of 45 to 60%, said plasticizer being selected from the group consisting of water and a slurry of alumina base chromium oxide catalyst material, extruding said catalyst mixture and drying and calcining the extrudate.

6. A process for preparing an extruded alumina base chromium oxide catalyst containing from between 70 and 80% of alumina, about 18 to 20% of chromium oxide, 1 to 3% of potassium oxide and 2 to 6% of silica, which in its prepared state has good activity, strength and appearance, which comprises filtering a slurry of an alumina base chromium oxide catalyst material to produce an alumina base chromium oxide catalyst filter cake, reducing the volatile content of the alumina base filter cake until a solids content of between about 80 and about 90% is obtained, mulling said alumina base material with a plasticizer and an extrusion lubricant to a solids content of 45 to 60%, said plasticizer being selected from the group consisting of water and a slurry of an alumina base chromium oxide catalyst material, extruding said catalyst mixture and drying and calcining the extrudate.

References Cited in the file of this patent

UNITED STATES PATENTS

| | | |
|---|---|---|
| 2,236,514 | Burk et al. | Apr. 1, 1941 |
| 2,325,287 | Thomas | July 27, 1943 |
| 2,735,801 | Gutzeit | Feb. 21, 1956 |
| 2,819,229 | Strecker et al. | Jan. 7, 1958 |